(12) United States Patent
Bos et al.

(10) Patent No.: US 9,276,767 B2
(45) Date of Patent: Mar. 1, 2016

(54) RING NODE, AN ETHERNET RING AND METHODS FOR LOOP PROTECTION IN AN ETHERNET RING

(75) Inventors: Jüergen Bos, Köln (DE); John Volkering, Harmelen (NL); Love Thyresson, Stockholm (SE); Richard Gough, Nottingham (GB)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 531 days.

(21) Appl. No.: 13/696,426

(22) PCT Filed: May 10, 2010

(86) PCT No.: PCT/SE2010/050511
§ 371 (c)(1),
(2), (4) Date: Nov. 26, 2012

(87) PCT Pub. No.: WO2011/142697
PCT Pub. Date: Nov. 17, 2011

(65) Prior Publication Data
US 2013/0064071 A1 Mar. 14, 2013

(51) Int. Cl.
*H04L 12/26* (2006.01)
*H04L 12/437* (2006.01)

(52) U.S. Cl.
CPC .................... *H04L 12/437* (2013.01)

(58) Field of Classification Search
CPC ... H04L 12/437; H04J 3/085; H04J 2203/006
See application file for complete search history.

(56) References Cited

U.S. PATENT DOCUMENTS

| | | | | |
|---|---|---|---|---|
| 8,355,348 | B1 * | 1/2013 | Miller | H04L 12/462 370/256 |
| 2008/0279203 | A1 * | 11/2008 | Ramalho Ribeiro dos Santos et al. | H04L 45/02 370/406 |
| 2008/0285466 | A1 | 11/2008 | Salam et al. | |
| 2009/0168671 | A1 * | 7/2009 | Holness | H04L 12/462 370/256 |
| 2010/0284413 | A1 * | 11/2010 | Abdullah | H04L 12/437 370/401 |
| 2010/0287405 | A1 * | 11/2010 | Soon | H04L 43/0817 714/4.1 |

OTHER PUBLICATIONS

Lee et al, Efficient Ethernet Multi-Ring Protection System, 2009, IEEE, p. 305-311.*
Lee Doojeong, et al: "Efficient ethernet multi-ring protection system", IEEE Communications Magazine, Jan. 9, 2008.

* cited by examiner

*Primary Examiner* — Anez Ebrahim
*Assistant Examiner* — Siren Wei
(74) *Attorney, Agent, or Firm* — Patents on Demand, P.A.; Brian K. Buchheit; Scott M. Garrett

(57) ABSTRACT

According to embodiments of the invention, a first ring node is arranged to protect against loops in an Ethernet ring by performing Ethernet ring protection (ERP) according to an Ethernet ring protection protocol (ERP) standard. The first ring node is located directly adjacent to at least one second ring node in the Ethernet ring which is not configured to perform ERP according to the same ERP protocol standard. The first ring node is configured to, upon detection of a link failure or recovery event in the Ethernet ring resulting in a flush operation of the filtering database (FDB) in the first ring node in accordance with the ERP protocol standard, send a message to the at least one second ring node which is operable to cause said at least one second ring node to perform a flush operation of its filtering database (FDB). Embodiments of the invention also include an Ethernet ring, a broadband communications network and methods for use in the first ring node and in the Ethernet ring.

12 Claims, 6 Drawing Sheets

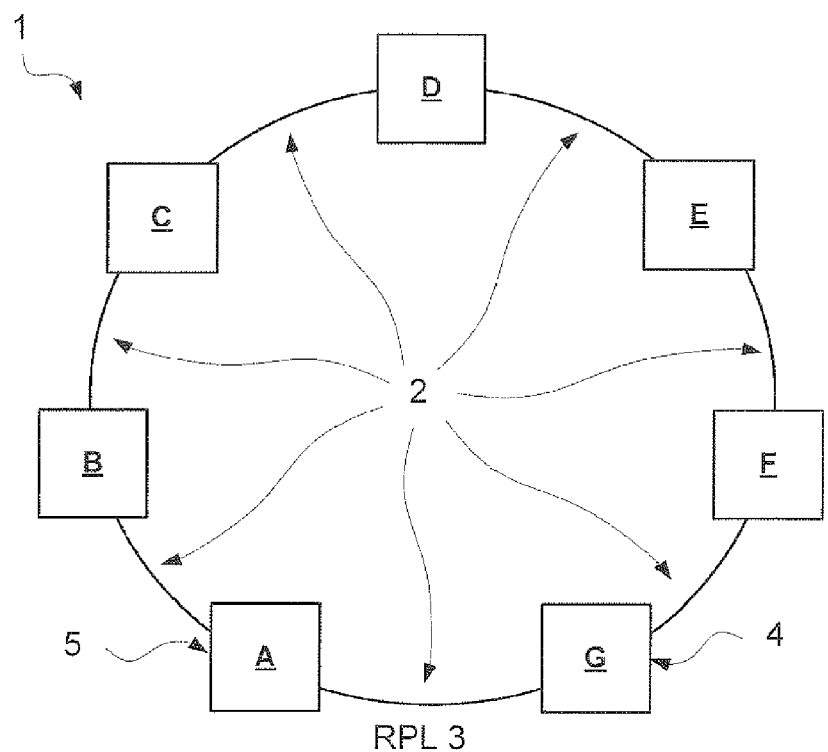
Fig. 1 - PRIOR ART
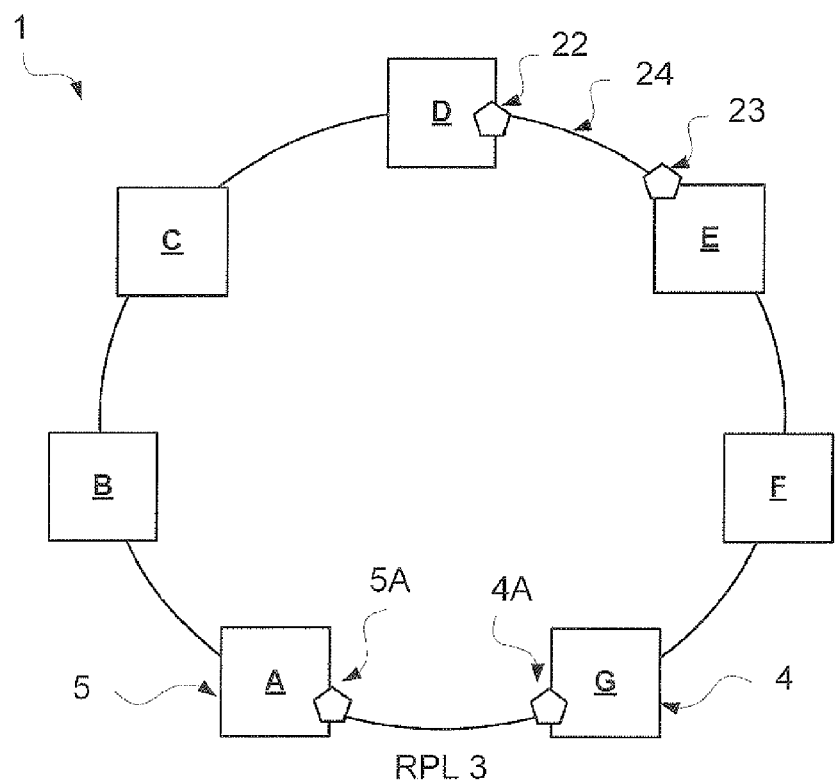
Fig. 2 - PRIOR ART

RING NODE, AN ETHERNET RING AND METHODS FOR LOOP PROTECTION IN AN ETHERNET RING

TECHNICAL FIELD

The invention relates to Ethernet networks, and in particular to a ring node for loop protection in an Ethernet ring. The invention further relates to an Ethernet ring, and methods for use in the ring node and in the Ethernet ring.

BACKGROUND

An Ethernet ring is a collection of ring nodes forming a closed loop whereby each ring node is connected to two adjacent ring nodes via duplex communication links. FIG. 1 illustrates an Ethernet ring 1 comprising seven ring nodes A-G connected to each other via duplex communication links 2.

A loop of data in the Ethernet ring 1 consumes a lot of resources in the Ethernet ring 1 and is therefore an undesired condition. There is therefore a need for protection against loops in the Ethernet ring 1. The topology of an Ethernet Ring Protection (ERP) network can be a single Ethernet ring or a collection of interconnected Ethernet rings.

The G.8032 protocol is designed for Ethernet ring topologies and is developed as a standardized alternative to replace the spanning tree protocol (xSTP). It assumes standard 802.1 Q bridges are used and standard 802.3 MAC frames go around the Ethernet ring. G.8032 Ethernet ring nodes generally support standard FDB MAC learning, forwarding, flush behavior and port blocking/unblocking mechanisms.

The principle of loop prevention within the Ethernet ring 1 is to block one of the ring links 2, either a pre-determined link or a failed link. For example, in a normal state where there is no link failure, as in FIG. 1, one of the ring links 2 is designated as a Ring Protection Link (RPL) 3. The RPL 3 blocks Ethernet traffic to avoid traffic looping. An RPL 3 blocking is provided by port blocking at both ends of the RPL 3. One of the nodes is called RPL Owner Node 4, e.g. the ring node G, which is also responsible for activating reversion behavior from protected, Manual Switching or Forced Switching conditions. The other node is called RPL Node 5, e.g. the ring node A, which is not responsible for activating reversion behavior. In G.8032 version 1, one end of RPL 3 is blocked for breaking the loop in the normal state. In the draft of G.8032 version 2, both ends of RPL 3 are blocked in a normal state to avoid unnecessary flooding.

FIG. 2 illustrates an Ethernet Ring Protection (ERP) state. When a link failure occurs, for example, a link 24 between ring node D and ring node E. Ring node D and ring node E block ports 22, 23 for the failed link 24 and send Ring-APS (R-APS) Signal Failure (SF) messages to indicate the link failure. The SF messages are circulated around the Ethernet ring through a Ring APS channel (not shown). When the RPL Owner node G and the RPL node A receive this message, they unblock the ports 4A, 5A to the RPL 3.

When a link failure is restored, for example, if the link failure between ring node D and ring node F in FIG. 2 disappears, then ring node D and ring node E keep port 22 and port 23 blocked and send out R-APS No Failure message. The messages are circulated around the ring through Ring APS channel. When the RPL Owner node (3 and RPL node A receive this message, they block the ports 4A, 5A to RPL 3 and send out R-APS Blocking messages. Ring node D and ring node E unblock the port 22 and 23 when they receive the R-APS Blocking messages from ring node G and ring node A. Now the ERP ring is back to the normal state.

However, Ethernet networks in such ring topologies are not necessarily constructed with the same Ethernet switch hardware for each ring node in the Ethernet ring. For example, a Metro Aggregation Network or a Mobile Backhaul Network may be connected to and be configured to aggregate data traffic from subscribers to Metro Core nodes located in the IP core, e.g. in the Ethernet ring. This aggregation or backhaul network may be built with different Carrier Ethernet technologies, for example, the Metro Aggregation Network may use pure L2 technologies and the Metro Core nodes may use IP/MPLS technologies. Thus, the Metro Core nodes may not be configured or capable to run the G.8032 protocol. This causes problems when connecting the Metro Core nodes to an otherwise G.8032 compliant Ethernet ring and results in long overall service restoration times and lost data traffic for long periods of time.

SUMMARY

It is understood by the inventor that it is desirable to achieve Ethernet ring protection (ERP) in Ethernet rings with improved service restoration times.

The problem is addressed by a first ring node arranged to protect against loops in an Ethernet ring by performing Ethernet ring protection (ERP) according to an Ethernet ring protection protocol (ERP) standard, the first ring node being located directly adjacent to at least one second ring node in the Ethernet ring which is not configured to perform ERP according to the same ERP protocol standard. The first ring node is characterized in that it is configured to, upon detection of a link failure or recovery event in the Ethernet ring resulting in a flush operation of the filtering database (MB) in the first ring node in accordance with the ERP protocol standard, send a message to the at least one second ring node which is operable to cause said at least one second ring node to perform a flush operation of its filtering database (FDB).

By changing the behavior of a first ring node performing ERP according to an ERP protocol standard that is placed adjacent to another ring node which is not configured to perform ERP according to the same ERP protocol standard, such that the first ring node in response to events that trigger an FDB flush operation in the first ring node may translate this to an event which trigger a FDB flush operation in the another ring node, the service restoration times may be kept at substantially the same level as in a pure Ethernet ring wherein all ring nodes performs ERP according to an ERP protocol standard. This is because each FDB in each of the ring nodes participating in the Ethernet ring will thus be flushed independent of whether or not one or more ring nodes are configured to perform ERP according to the ERP protocol standard. This will minimize the time it will take the FDB MAC learning process in the ring nodes to rebuild all FDBs with new FDB entries according to the new Ethernet ring topology, and thus minimize the service restoration time of the service layer responsible for the Ethernet data traffic in the Ethernet ring. It will also avoid data traffic losses due to old and erroneous FDB entries in the FDBs of the ring nodes that are not configured to perform ERP according to the same ERP protocol standard.

An advantage of the above described first ring node is that it requires only a minor modification of the standard behaviour of the adjacent ring nodes when performing the ERP according to an ERP protocol standard.

A further advantage of the above described first ring node is that by in this way open up and allowing a ring node which is not configured to perform ERP according to the ERP protocol standard to form a part of an Ethernet ring otherwise performing ERP according to the ERP protocol standard without incurring additional service restoration time, network migration into networks performing ERP according to the ERP protocol standard is eased.

The first ring node may also be configured to be communicatively connected with a third ring node in the Ethernet ring by tunneling a dedicated VLAN through the at least one second ring node, wherein said tunnel may be used by the ERP protocol standard. The third ring node also being configured to perform ERP according to the ERP protocol standard. This enables the first ring node to exchange messages (e.g. G.8032 R-APS control messages) with the third ring node in accordance with the ERP protocol standard, and thus "close" the Ethernet ring according to the ERP protocol standard.

The at least one second ring node in the Ethernet ring may be configured to perform ERP according to another ERP protocol standard. Therefore, the first ring node may further be configured to react to the configuration messages sent by the at least one second ring node in the Ethernet ring according to the another ERP protocol standard such that the standard operations of the ERP according to another ERP protocol standard in the at least one second ring node is not disrupted. This allows the first ring node to fake ERP with the at least one second ring node according to the another ERP protocol standard implemented therein, such that the at least one second ring node believes that it is part of an Ethernet ring implementing ERP according to the another ERP protocol standard.

According to one example, the ERP protocol standard for the first ring node may be the ITU-T G.8032 ERP switching protocol, and the another ERP protocol standard for the at least one second ring node may be the Spanning Tree Protocol (STP) or the Rapid Spanning Tree Protocol (RSTP). In the case of the another ERP protocol standard for the at least one second ring node is the Spanning Tree Protocol (SIP), the first ring node may be arranged to react to the configuration messages sent by the at least one second ring node in the Ethernet ring according to the another ERP protocol standard by, for example, discarding all configuration messages. Thus, the STP ring node will believe it is placed in an Ethernet ring running the STP protocol. However, in the case of the another ERP protocol standard for the at least one second ring node is the Rapid Spanning Tree Protocol (RSTP), the first ring node may be arranged to react to the configuration messages sent by the at least one second ring node in the Ethernet ring according to the another ERP protocol standard by, for example, responding to configuration messages sent by the at least one second ring node in the Ethernet ring during the initial setup of the Rapid Spanning Tree Protocol (RSTP). Thus, the RSTP ring node will believe it is placed in an Ethernet ring running the RSTP protocol.

Furthermore, the message sent by the first ring node may comprise a Spanning Tree Protocol Topology Change Notification (STP TCN) or a Rapid Spanning Tree Protocol Topology Change Notification (RSTP TCN), and may be sent by the first ring node to the at least one second ring node using the Internal Network-Network-interface (I-NNI).

Link failure or recovery events occurring between the first ring node and the at least second ring node in the Ethernet ring may additionally be supervised by Ethernet Continuity Check Messages (CCM) in accordance with the IEEE 802.1ag Connectivity Fault Management standard protocol. By defining all ring nodes as Maintenance End Points (MEP) on all links that are supervised by Ethernet Continuity Check Messages (CCM), the first ring node is enable to, in case link failure or recovery events can not be discovered physically between adjacent ring nodes, detect further link failure or recovery events.

The problem is also addressed by a method for use in a first ring node to protect against loops in an Ethernet ring by performing ERP according to a ERP protocol standard, the first ring node being located directly adjacent to at least one second ring node in the Ethernet ring which is not configured to perform ERP according to the same ERP protocol standard, comprising the steps of: detecting a link failure or recovery event in the Ethernet ring according to the ERP protocol standard; deciding to perform a flush operation of the filtering database (FDB) in the first ring node in response to the detected link failure or recovery event. The method is characterized by further comprising the step of: in response to the decision to perform the flush operation, sending a message to the at least one second ring node which is operable to cause said at least one second ring node to perform a flush operation of its filtering database (FDB).

The problem is further addressed by an Ethernet ring comprising a first ring node and at least a second ring node arranged to protect against loops in an Ethernet ring by performing ERP according to a ERP protocol standard, said Ethernet ring further comprising at least a third ring node which is not configured to perform ERP according to the same ERP protocol standard. The Ethernet ring is characterized in that each of the first ring node and the at least a second ring node that is located directly adjacent to the at least one third ring node in the Ethernet ring is configured to, upon detection of a link failure or recovery event in the Ethernet ring resulting in a flush operation of the filtering databases (FDB) in the first ring node and the at least a second ring node in accordance with the ERP protocol standard, send a message operable to cause said at least one third ring node to perform a flush operation of its filtering database (FDB).

In case of the at least one third ring node being configured to perform ERP according to another ERP protocol standard and comprising more than one ring node, the Ethernet ring may further be provided with resilience measures for the connectivity between the more than one ring nodes. This may, for example, be provided between the more than one ring nodes using MPLS or STP technologies.

The problem is yet further addressed by a method for use in an Ethernet ring comprising a first ring node and at least a second ring node arranged to protect against loops in an Ethernet ring by performing ERP according to a ERP protocol standard, said Ethernet ring further comprising at least one third ring node which is not configured to perform ERP according to the same ERP protocol standard, comprising the steps of: detecting a link failure or recovery event in the Ethernet ring according to the ERP protocol standard; deciding to perform a flush operation of the filtering database (FDB) in each of the first ring node and the at least: a second ring node in response to the detected link failure or recovery event. The method is characterized by further comprising the step of: in response to the decision to perform the flush operation, sending a message from each of the first ring node and the at least a second ring node that are located directly adjacent to the at least one third ring node in the Ethernet ring to the at least one third ring node which is operable to cause said at least one third ring node to perform a flush operation of its filtering database (FDB).

The problem is yet further addressed by a broadband communications network comprising a ring node and/or an Ethernet ring as described above.

Further advantageous embodiments of the methods, the Ethernet ring and the broadband communications network correspond to the advantageous embodiments already set forth with reference to the previously mentioned ring node.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIG. 1 illustrates schematically an Ethernet ring.

FIG. 2 illustrates schematically an Ethernet Ring Protection (ERP) state in an Ethernet ring.

DETAILED DESCRIPTION

Figure 3:
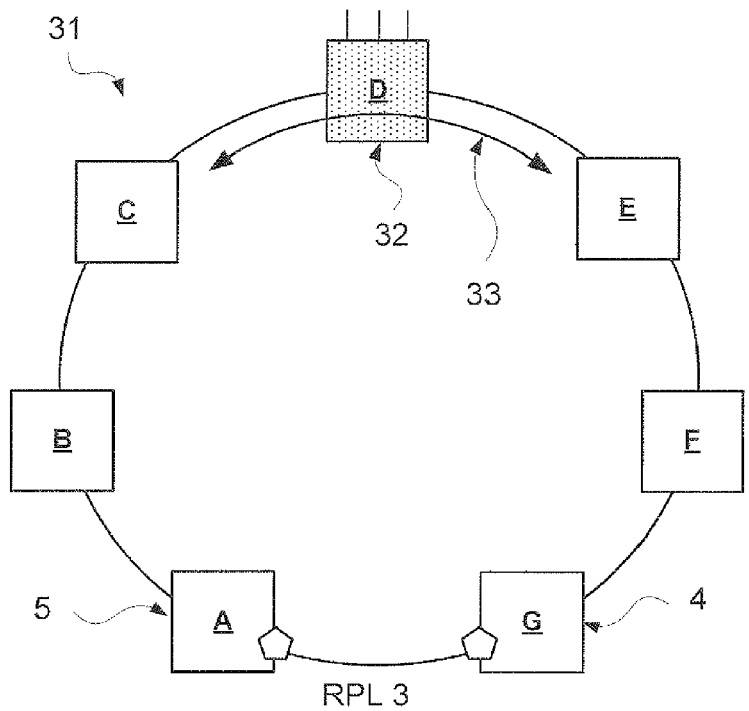
FIG. 3 illustrates schematically interworking of a non-G.8032 capable node with an G.8032 Ethernet ring.

FIG. 3 shows schematically an Ethernet ring 31 comprising seven ring nodes A-G connected to each other via duplex communication links. The ring nodes A-C and E-G in the Ethernet ring 31 are G.8032 capable nodes, where the ring node G is the RPL Owner Node 4 and the ring node A is the RPL Node 5. However, in the Ethernet ring 31, a non-G.8032 capable node 32, i.e. ring node D, is connected to adjacent G.8032 capable ring nodes C and E and thus forms part of the otherwise G.8032 compliant Ethernet ring 31.

In order enable the Ethernet ring protection (ERP) according to the Ethernet ring protection protocol standard G.8032 in the Ethernet ring 31, one interworking alternative arrangement is shown in FIG. 3, where the adjacent G.8032 capable ring nodes C and E are arranged to tunnel the WAN that comprises the R-APS messages 33 according to the Ethernet ring protection protocol standard G.8032 through the non-G.8032 capable node D 32.

However, as previously mentioned above, in an G.8032 capable Ethernet ring and upon the occurance of a link failure or recovery event, Ring-APS (R-APS) Signal Failure (SF) messages will be circulated around the Ethernet ring to indicate the link failure or recovery. In order to rebuild the filtering databases (FDBs) in each of the ring nodes due to the resulting ring topology change, the SF messages are also arranged to activate all ring nodes to "flush" their FDBs so that all FDB entries are cleared. It should be noted that the FDB entries here refers only to the MAC addresses learnt on the ERP ring ports in the ring nodes and not on other ports in the ring nodes. The FDB MAC learning process will then rebuild the FDBs with new FDB entries as all data traffic frames, now with unknown destination addresses, subsequently will be flooded, i.e. broadcasted, throughout the G.8032 capable Ethernet ring.

However, if there is a ring node D 32 in the G.8032 Ethernet ring 31 which is not configured to perform ERP according to the ERP protocol standard G.8032, the non-G.8032 capable node D 32 will not flush its FDB in case of a link failure or recover event. The non-G.8032 capable node D 32 will therefore comprise erroneous FDB entries in its FDB which may take the FDB MAC learning process a long time to correct. In a worst case, data traffic can consequently be lost up to a time period corresponding to the FDB MAC address aging time, which is typically in a range of 5 minutes. Thus, while the physical layer in the Ethernet ring 31 may be protected within 50 ms as indicated by the ERP protocol standard G.8032, the service layer responsible for the Ethernet data traffic will only be restored with the speed of FDB MAC learning process and is also well dependent on the available bandwidth for the flooding of the data traffic frames. Consequently, the result is long service restoration time of the service layer responsible for the Ethernet data traffic in the Ethernet ring 31 upon a link failure or recovery event. This is particularly critical for sensitive data traffic applications such as, for example, for real-time gaming applications, etc.

Figure 4:
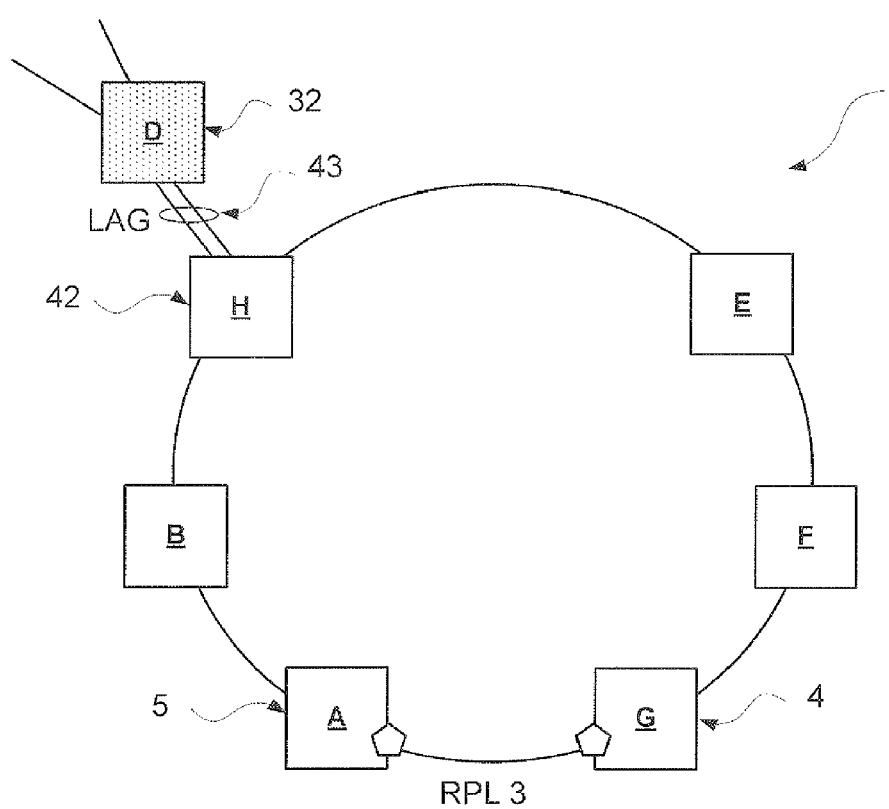
FIG. 4 illustrates schematically another interworking of a non-G.8032 capable node with an G.8032 Ethernet ring.

In order to overcome the problems described above, another interworking alternative arrangement is shown by the Ethernet ring 41 in FIG. 4. Here, a redundant G.8032 capable ring node H 42 has been provided in the Ethernet ring 41 to act as an intermediate ring node between the non-G.8032 capable node D 32 and the now fully G.8032 compliant Ethernet ring 41. The non-G.8032 capable node D 32 may be connected redundantly via a Link Aggregation Group 43 (LAG) to the G.8032 capable ring node H 42 in the Ethernet ring 41. However, in case of failures of the LAG 43, this interworking alternative arrangement suffers from the disadvantage of having even longer convergence and service restoration times than the previous alternative. This arrangement also incur additional implementation costs since it requires two ring nodes instead of one ring node to be deployed in connecting the non-G.8032 capable node D 32 to the Ethernet ring 41, and additional interfaces have to be provided in order to be able to realize the connection. Furthermore, often the implementation of a LAG 43 does not guarantee full bandwidth utilization since the data traffic distribution algorithms in the ring node do not always lead to a well balanced usage of the single LAG 43 constituents.

Figure 5:
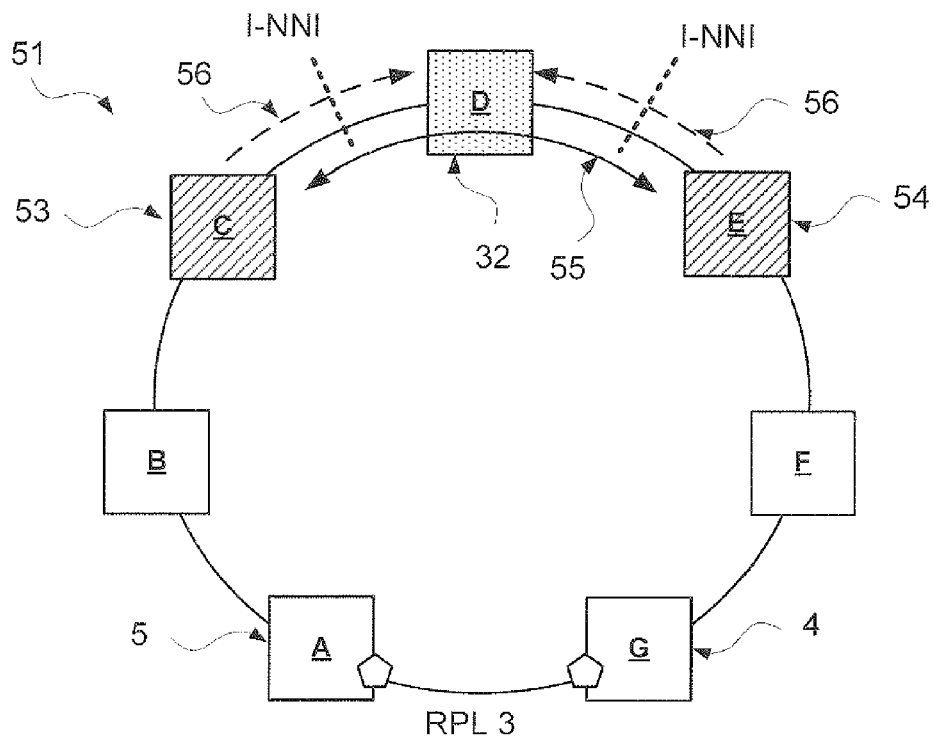
FIG. 5 illustrates schematically interworking of two adjacent G.8032 capable nodes C 53 and E 54 in an G.8032 Ethernet ring with a non-G.8032 capable node 32 according to an embodiment of the invention.

FIG. 5 shows schematically the interworking of two adjacent G.8032 capable nodes C 53 and E 54 in an Ethernet ring 51 with a non-G.8032 capable node 32 according to an embodiment of the invention. As in the alternative interworking arrangement described in relation to FIG. 3, the two adjacent G.8032 capable nodes C 53 and E 54 in the Ethernet ring 51 may here be arranged to tunnel the VLAN that comprises the R-APS messages 55 according to the Ethernet ring protection protocol standard G.8032 through the non-G.8032 capable node D 32.

Upon detecting a link failure or recovery event in the Ethernet ring 51, the two adjacent G.8032 capable nodes C 53 and E 54 may decide in accordance with the ERP protocol standard to perform a flush operation of its filtering database (FDB).

In response to this decision to perform the flush operation and according to an embodiment of the invention, the two adjacent G.8032 capable nodes C 53 and E 54 may be configured to also send a message 56 to the non-G.8032 capable node D 32. The message may be operable to cause the non-G.8032 capable node D 32 to also perform a flush operation of its filtering database (FDB). The flush operation in the non-G.8032 capable node D 32 then removes all prior FDB entries from the FDB in the non-G.8032 capable node D 32, except for the FDB entries for the ports on which it received the messages from each of the two adjacent G.8032 capable nodes C 53 and E 54. It should be noted that when referring to FDB entries only the MAC addresses learnt on the ERP ring ports are intended and not on other ports in the ring nodes.

In case the non-G.8032 capable node D 32 is configured to perform ERP according to the Spanning Tree Protocol (STP), the message 56 may be a Spanning Tree Protocol Topology Change Notification (STP TCN). In case the non-G.8032 capable node D 32 is configured to perform ERP according to the Rapid Spanning Tree Protocol (RSTP), the message 56 may be a Rapid Spanning Tree Protocol Topology Change Notification (RSTP TCN). The messages 56 may be sent by the two adjacent G.8032 capable nodes C 53 and E 54 in the Ethernet ring 51 using the Internal Network-Network-Interface (I-NNI). Thus, the messages 56 will force the non-G.8032 capable node D 32 to flush its filtering database (MB) twice, once for each message 56 received from each of the two adjacent G.8032 capable nodes C 53 and E. 54 in the Ethernet ring 51. This ensures that the MB is flushed on both ring ports in the non-G.8032 capable node D 32, that is, the message 56 received from the left adjacent G.8032 capable node C 53 on the left ring port in the non-G.8032 capable node D 32 invokes a flush operation for the right ring ports, while the message 56 received from the right adjacent G.8032 capable node E 54 on the right ring port in the non-G.8032 capable node D 32 invokes a flush operation for the left ring ports. The signalling of each of the two adjacent G.8032 capable nodes C 53 and E 54 are described in more detail below in relation to FIG. 7.

By having each of the two adjacent G.8032 capable nodes C 53 and E 54 being arranged to translate events that trigger an FDB flush operation in each of the two adjacent G.8032 capable nodes C 53 and E 54 to an event which will trigger a FDB flush operation in the non-G.8032 capable node D 32, the service restoration times of the Ethernet ring 51 may be kept at substantially the same level as in a pure G.8032 capable Ethernet ring wherein all ring nodes A-G performs ERP according to the ERP protocol standard G.8032. This because the FDB in the non-G.8032 capable node D 32 will now also be flushed as the FDBs in the two adjacent G.8032 capable nodes C 53 and E 54 are flushed in accordance with the ERP protocol standard G.8032. This will minimize the time it will take the FDB MAC learning process in both the non-G.8032 capable node D 32 and the G.8032 capable nodes A-C and E-G to rebuild all the FDBs with new FDB entries according to the new Ethernet ring topology. This because all data traffic frames received at the non-G.8032 capable node D 32 and the G.8032 capable nodes A-C and E-G now being broadcasted throughout the Ethernet ring 51 due to the fact they comprise unknown addresses, will directly start to populate the FDBs with new FDB entries according to the new Ethernet ring topology. As a consequence, the service restoration time of the service layer responsible for the Ethernet data traffic in the Ethernet ring 51 will be minimized. Furthermore, due to the fact that there is no risk of having old and erroneous FDB entries in the FDBs, potential data traffic losses is further eliminated.

The two adjacent G.8032 capable nodes C 53 and E 54 may further be configured to react to configuration messages sent by the non-G.8032 capable node D 32 if the non-G.8032 capable node D 32 is running ERP according to another ERP protocol standard. This is described in more detail below in relation to FIG. 8.

Also, since the ITU-T G.8032: Ethernet ring protection switching standard document also implements FDB flush optimizations to avoid these when unnecessary, the two adjacent G.8032 capable nodes C 53 and E 54 may also be configured to correlate the sending of the messages 56 in accordance with these flush optimisations.

Furthermore, in order to detect link failure or recovery events that can not be discovered physically between two adjacent G.8032 capable nodes C 53 and E 54 using the VLAN tunnel, the links between the two adjacent G.8032 capable nodes C 53 and E 54 and the non-G.8032 capable node D 32 may additionally be supervised by Ethernet Continuity Check Messages (CCM) in accordance with the IEEE 802.1ag Connectivity Fault Management standard document. By defining the two adjacent G.8032 capable nodes C 53 and E 54 and the non-G.8032 capable node D 32 as Maintenance End Points (MEP) on all links that are supervised by Ethernet Continuity Check Messages (CCM), detection of link (failure or recovery events that can not be discovered physically between two adjacent G.8032 capable nodes C 53 and E 54 using the VLAN tunnel is enabled. Preferably, in such a configuration, all ring nodes A-G in the Ethernet ring 51 are defined as Maintenance End Points (MEP) and all links in the Ethernet ring 51 supervised by Ethernet Continuity Check Messages (CCM).

Figure 6:
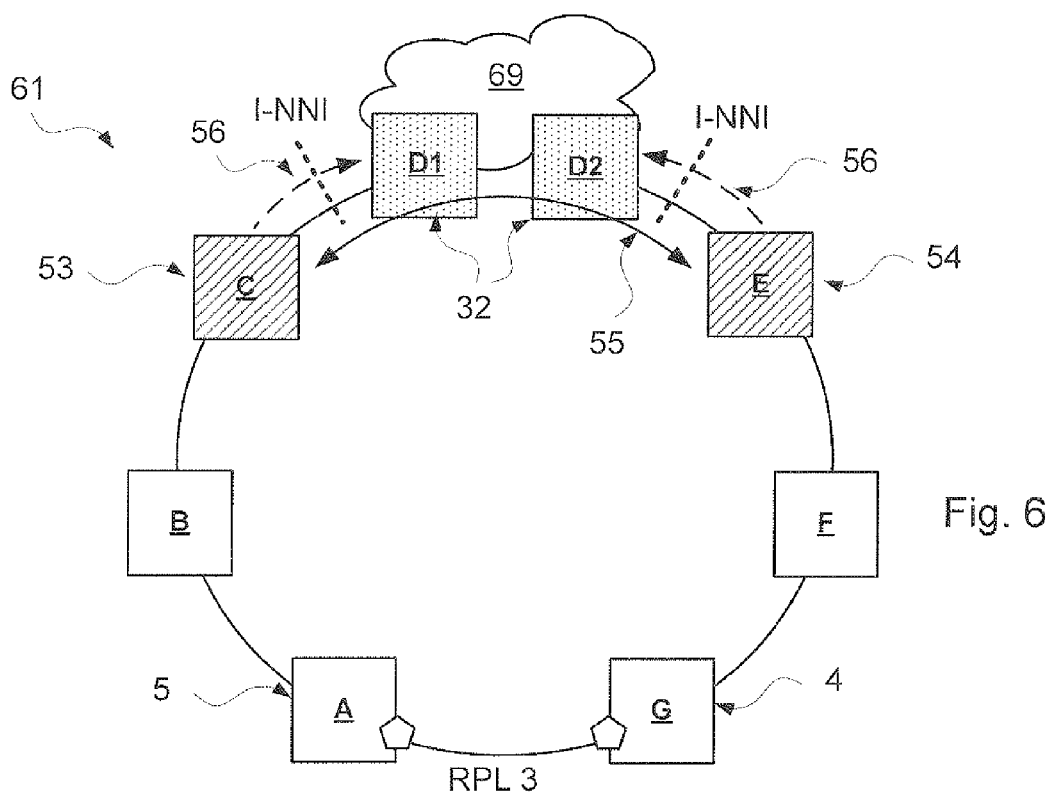
FIG. 6 illustrates schematically interworking of two adjacent G.8032 capable nodes C 53 and E 54 in an G.8032 Ethernet ring with dual non-G.8032 capable nodes 32 according to another embodiment of the invention.

FIG. 6 shows schematically the interworking of two adjacent G.8032 capable nodes C 53 and E 54 in an Ethernet ring 61 with dual non-G.8032 capable nodes 32, i.e. ring nodes D1 and D2, according to another embodiment of the invention. The dual non-G.8032 capable nodes D1, D2 32 may be provided in order to have redundancy towards an Metro aggregation or backhaul network 69 being connected to the Ethernet ring 61 through the dual non-G.8032 capable nodes D1, D2 32. Here, the two adjacent G.8032 capable nodes C 53 and E 54 in the Ethernet ring 61 may also be arranged to tunnel the VLAN that comprises the R-APS messages 55 according to the Ethernet ring protection protocol standard G.8032 through both of the non-G.8032 capable nodes D1, D2 32.

In this embodiment, it needs to be guaranteed that the logical connection between the two adjacent G.8032 capable nodes C 53 and E 54, i.e. the VLAN transporting the R-APS messages, continuously exists. Resiliency measures that ensure the connectivity between dual non-G.8032 capable nodes D1, D2 32 may therefore be provided using, for example, MPLS or STP technologies.

In the previous embodiment, the non-G.8032 capable node D 32 is forced to flush its filtering database (TDB) once for each message 56 received from each of the two adjacent G.8032 capable nodes C 53 and E 54 in the Ethernet ring 51. In this embodiment, the non-G.8032 capable nodes D1 and D2 32 will only receive one message 56 from its adjacent G.8032 capable nodes C 53 and E 54, respectively. However, for example, if the nodes D1 and D2 are configured to perform ERP according to STP, one of the nodes D1 and D2 will become the root bridge and the other one a non-root bridge. Assuming that D1 is determined to be the root bridge, the root node D1 will receive the TCN message 56 from its left adjacent G.8032 capable node C 53 on its left ring port which invokes a flush operation for its right ring ports. This will also result in that the root node D1 sends a TCN message to the non-root node D2. The non-root node D2 will thus receive one TON message from the root node D1 and one TCN message 56 from its right adjacent G.8032 capable node E 54 resulting in a flush operation on both right and left ring ports. Additionally, the non-root node D2 may forward the TCN received from its right adjacent G.8032 capable node E 54 to its root node D1. The root node D1 will thus also receive a TCN message on its right ring port which invokes a flush operation for its left ring ports. This ensures that the FDB is flushed on both ring ports in both of the non-G.8032 capable nodes D1 and D2 32.

Figure 7:
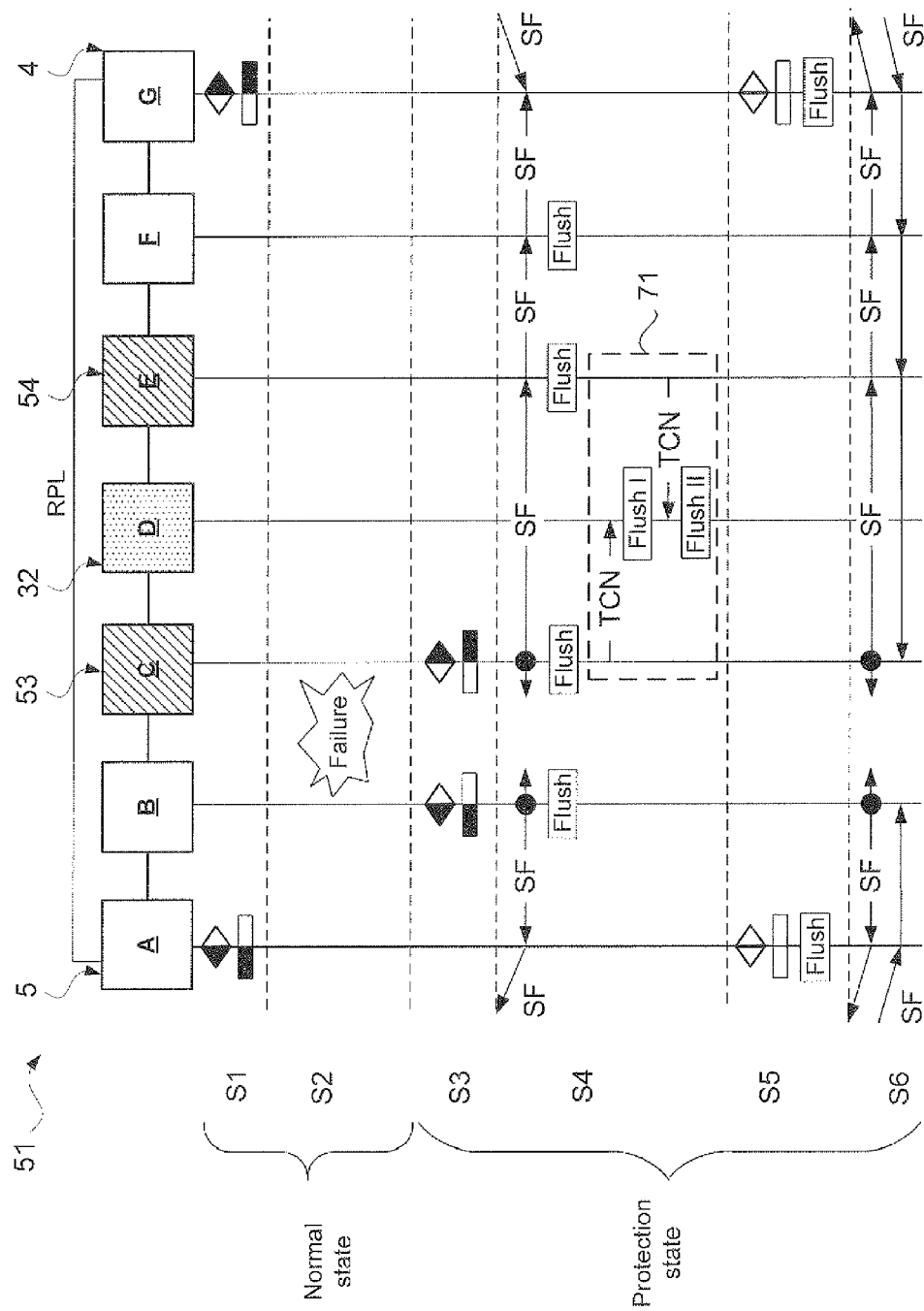
FIG. 7 shows a signalling diagram illustrating a method for handling a single link failure in an G.8032 Ethernet ring comprising a non-G.8032 capable node D 32 according to an embodiment of the invention.

FIG. 7 shows a signalling diagram illustrating a method for handling a single link failure in an G.8032 Ethernet ring comprising a non-G.8032 capable node D 32 according to an embodiment of the invention. The signalling diagram in FIG. 7 may be compared with the signalling diagram shown in Figure IV-1/G.8032/Y.1344—Single link failure in the ITU-T G.8032: Ethernet ring protection switching standard document.

In step S1, the Ethernet ring 51 operates in a normal state where no link failure has occurred. The RPL blocking is provided by R-APS channel or port blocking at both ends of the RPL, i.e. in both the RPL Owner Node U and the RPL Node A.

In step S2, a single link failure occurs between the ring nodes B and C.

In step S3, the ring nodes B and C detects the link failure event and after respecting the holdoff time, blocks the failed R-APS channel or port.

In step S4, the ring nodes B and C periodically send Signal Failure (SF) messages, on both ring ports, as long as the single link failure persists. In FIG. 7, this is shown by the filled circles indicating the source of the SF messages. Furthermore, in response to the detected link failure event in step S3, the ring nodes B and C may decide to flush its filtering database (FDB).

As indicated by the dashed area 71 in FIG. 7 and according to an embodiment of the invention, since the ring node C is an adjacent G.8032 capable ring node C 53 connected to the non-G.8032 capable ring node D 32 it sends, in response to its decision to flush its FDB, a message to the non-G.8032 capable ring node D 32 which is operable to cause the non-G.8032 capable ring node D 32 to also flush its FDB. If, for example, the non-G.8032 capable ring node D 32 is configured to perform ERP according to the STP protocol, the message may be a STP TCN message as shown in FIG. 7. Upon receiving the STP TCN message from the G.8032 capable ring node C 53, the non-G.8032 capable ring node D 32 will flush its FDB on all ports participating in the STP domain except for the port where it received the STP TCN message, i.e. a ring port in the direction of the G.8032 capable ring node C 53. This is standard behaviour of a STP root bridge as described in IEEE 802.1D MAC Bridges.

Upon receiving the SF message and in response to its decision to flush its FDB, the ring node F being the G.8032 capable ring node E 54 adjacent to a non-G.8032 capable ring node D 32 also sends a message, e.g. a STP TCN message, to the non-G.8032 capable ring node D 32 which is operable to cause the non-G.8032 capable ring node D 32 to flush its FDB. Upon receiving the STP TCN message from the G.8032 capable ring node E. 54, the non-G.8032 capable ring node D 32 will flush its FDB on all ports participating in the STP domain except for the port where it received the STP TCN message, i.e. a ring port in the direction of the G.8032 capable ring node E 54.

In step S5, the RPL Owner Node G and the RPL Node A unblocks the RPL at both ends and flushes their FDBs.

In step S6, the Ethernet ring 51 operates in a stable protection state where SF messages are periodically sent by the ring nodes B and C, on both ring ports, as long as the single link failure persists. The periodical SF messages do not trigger any further action in neither the ring nodes A-B, E-G nor in the adjacent G.8032 capable ring nodes C 53 and E 54.

It should be noted that although the exemplary method above is described for single link failure event, the method may also similarly be applied for other link failure events or recovery events. For example, in case of a single link failure recovery event, the flushing of the FDBs in the adjacent G.8032 capable ring nodes C 53 and E 54 may be triggered by NR RB (No Request, Ring Blocked) messages in case the non-G.8032 capable ring node D 32, for example, is configured to perform ERP according to the STP protocol. Thus, the adjacent G.8032 capable ring nodes C 53 and F54 may upon receiving the NR RB message and in response to its decision to flush its FDB, send a message, e.g. a STP TCN message, to the non-G.8032 capable ring node D 32 which is operable to cause the non-G.8032 capable ring node D 32 to flush its FDB. This signalling may be compared with the signalling diagram shown in Figure IV-3/G.8032/Y.1344—Single link failure recovery (Non-Revertive operation) in the ITU-T G.8032: Ethernet ring protection switching standard document.

Other link failure events that may lead to the flushing of the FDBs in the ring nodes A-B, E-G and the adjacent G.8032 capable ring nodes C 53 and E 54 and thus for which the method described above may be implemented, may include single unidirectional link failures, RPL link failures, etc.

Figure 8:
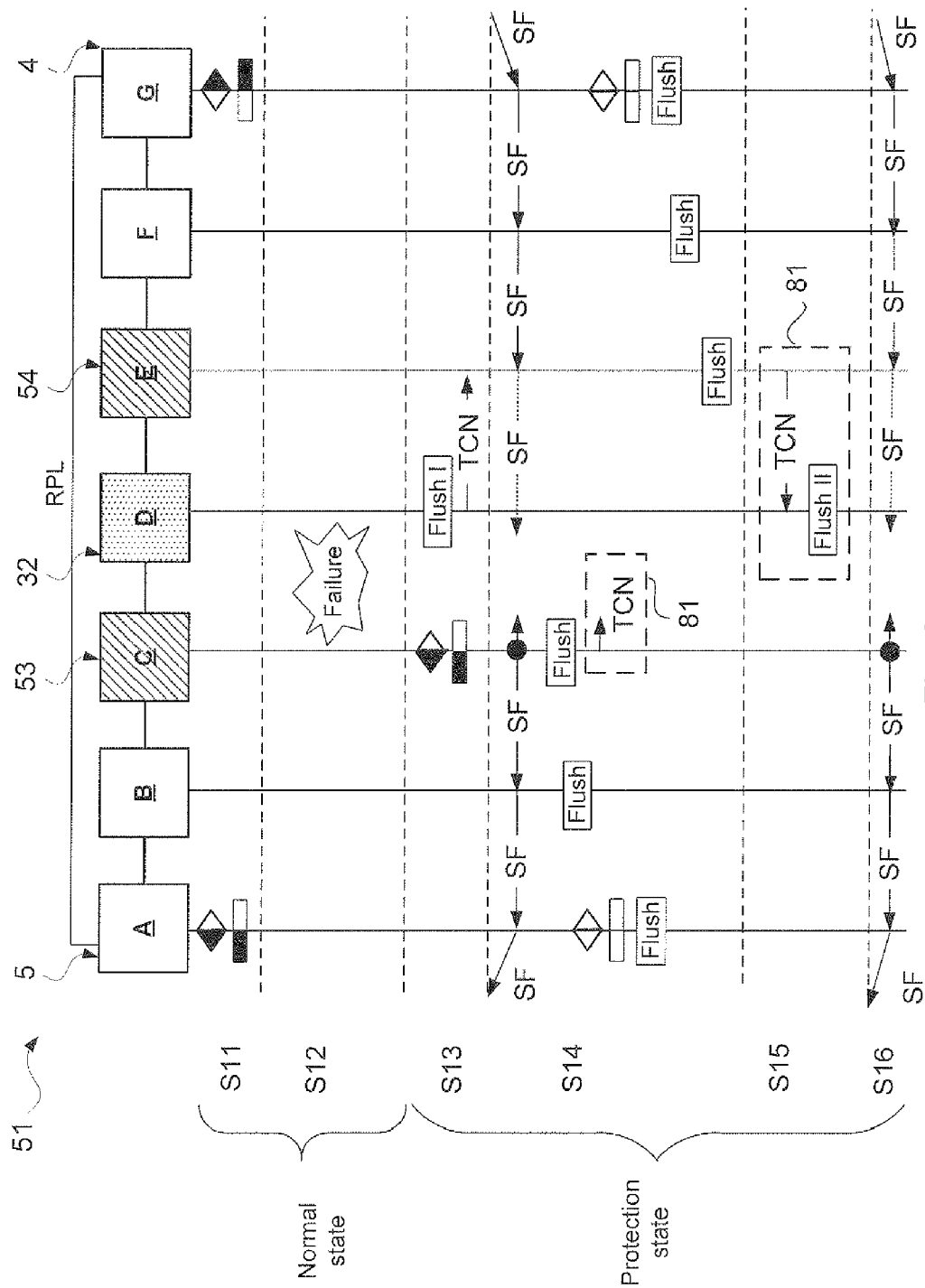
FIG. 8 shows a signalling diagram illustrating a method for handling a single link failure in an G.8032 Ethernet ring comprising a non-G.8032 capable node D 32 according to a further embodiment of the invention.

FIG. 8 shows a signalling diagram illustrating a method for handling a single link failure in an G.8032 Ethernet ring comprising a non-G.8032 capable node D 32 according to an embodiment of the invention. Here, the single link failure occurs in between the adjacent G.8032 capable ring node C 53 and the non-G.8032 capable node D 32.

In step S11 the Ethernet ring 51 operates in a normal state where no link failure has occured. The RPL blocking is provided by R-APS channel or port blocking at both ends of the RPL, i.e. in both the RPL Owner Node G and the RPL Node A.

in step S12, a single link failure occurs between the adjacent G.8032 capable ring node C 53 and the non-G.8032 capable node D 32.

In step S13, the adjacent G.8032 capable ring node C 53 detects the link failure event, e.g. a physical link loss condition, and after respecting the holdoff time, blocks the failed R-APS channel or port. The non-G.8032 capable node D 32 also detects the link failure event and after respecting the holdoff time, blocks the failed port. In case the non-G.8032 capable node D 32 is configured to run STP, the non-G.8032 capable node D 32 assumes that it is the root bridge and will consequently invoke a FDB flush operation for all ports participating in the STP domain except for the port for which it detected the link failure event and send a TCN message to the adjacent G.8032 capable ring node E 54. Again, this is standard behaviour of a STP root bridge as described in IEEE 802.1D MAC. Bridges. The TCN message may be ignored by the adjacent G.8032 capable ring node E 54.

In step S14, the adjacent G.8032 capable ring node C 53 periodically send Signal Failure (SF) messages, on both ring ports, as long as the single link failure persists. In FIG. 8, this is shown by the filled circle indicating the source of the SF messages. Furthermore, in response to the detected link failure event in step S13, the adjacent G.8032 capable ring node C 53 may decide to flush its filtering database (FDB).

As indicated by the dashed areas 81 in FIG. 8 and according to an embodiment of the invention, since the ring node C is the adjacent G.8032 capable ring node C 53 connected to the non-G.8032 capable ring node D 32 it will try to send, in response to its decision to flush its FDB, a message to the non-G.8032 capable ring node D 32 which is operable to cause the non-G.8032 capable ring node D 32 to also flush its FDB. However, due to the link failure event, the message will not reach the non-G.8032 capable ring node D 32. Upon receiving the SF message from the ring node B, the RPL Owner Node G and the RPL Node A unblocks the RPL, at both ends and flushes their FDBs.

In step S15, upon receiving the SF message and in response to its decision to flush its FDB, the ring node F being the G.8032 capable ring node E 54 adjacent to the non-G.8032 capable ring node D 32 will also try to send a message, e.g. a STP TCN message, to the non-G.8032 capable ring node D 32 which is operable to cause the non-G.8032 capable ring node D 32 to flush its FDB. Contrary to the previous message, this message will reach the non-G.8032 capable ring node D 32 since there is no link failure between the non-G.8032 capable ring node D 32 and the adjacent G.8032 capable ring node E 54. Upon receiving the STP TCN message from the adjacent G.8032 capable ring node E 54, the non-G.8032 capable ring node D 32 will flush its FDB on all ports participating in the STP domain except for the port where it received the STP TCN message, i.e. a ring port in the direction of the G.8032 capable ring node E 54. In our case, however, this FDB flush operation will not take effect since the ring port in the direction of the adjacent G.8032 capable ring node C 53 is anyhow not in operation. It should also be noted that the adjacent G.8032 capable ring node E 54 may keep sending SF messages towards the adjacent G.8032 capable ring node C 53, but the non-G.8032 capable ring node D 32 is not going to be able to pass the SF messages on the adjacent G.8032 capable ring node C 53 due to the single link failure.

In step S16, the Ethernet ring 51 operates in a stable protection state where SF messages are periodically sent by the adjacent G.8032 capable ring node C 53, on both ring ports, as long as the single link failure persists. The periodical SF messages do not trigger any further action in neither the ring nodes A-B, E-G nor in the adjacent G.8032 capable ring nodes C 53 and C 54.

It should be noted that although the exemplary method above is described for a single link failure event, the method may also similarly be applied for other link failure events or recovery events as described in relation to the previous embodiment.

Figure 9:
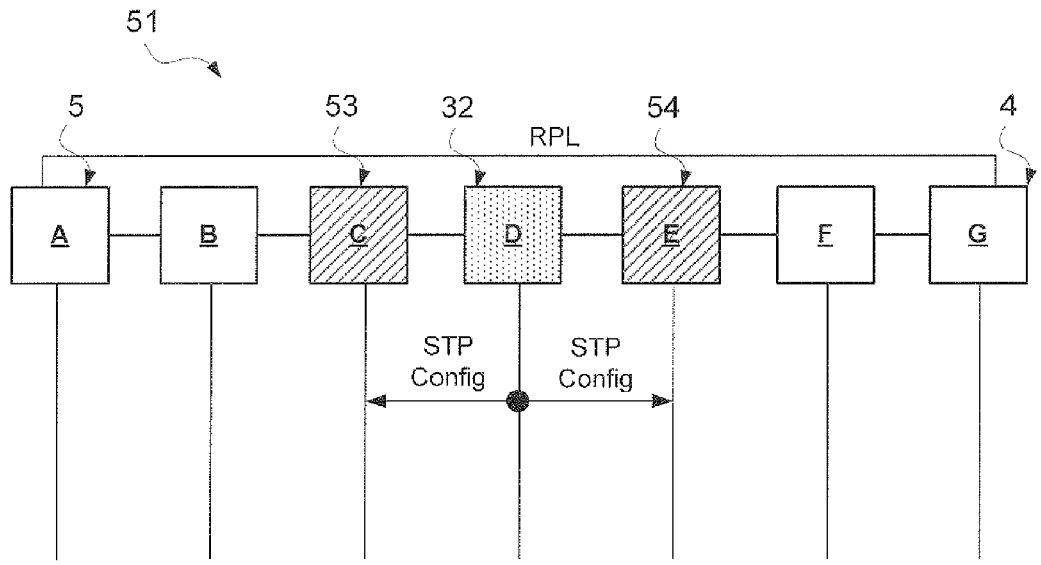
FIG. 9 shows a signalling diagram illustrating a method for handling initial configuration of a non-G.8032 capable node D 32 in an G.8032 Ethernet ring according to a further embodiment of the invention.

FIG. 9 shows a signalling diagram illustrating a method for handling initial configuration of a non-G.8032 capable node D 32 in an G.8032 Ethernet ring according to an embodiment of the invention. If, for example, the non-G.8032 capable node D 32 is configured perform ERP according to the STP protocol, the non-G.8032 capable node D 32 will assume that it is placed in an Ethernet ring implementing the STP protocol. This will prompt the following initial behaviour of the MAC bridges in the non-G.8032 capable node D 32.

As the ring node D is turned on, configuration BPDU (Bridge Protocol Data Unit) messages are sent by the ring node D through every connected port at a regular time intervals, e.g. using the Hello Timer with a default timing of every 2 seconds. At start up, every ring node configured to perform ERP according to the STP protocol, such as, the ring node D, believes itself as being the root of the tree, and hence the ring node D will set the Root Identifier to the value of its own Bridge Identifier in the configuration BPDU messages it transmits.

Normally, when a neighboring ring node configured to perform ERP according to the STP protocol receives this configuration BPDU message, the neighboring ring node compares the received configuration BPDU message with the best BPDU it has. If the neighboring ring node concludes that the new BPDU is better, it will use the sending ring node D as the root and propagate the configuration BPDU messages to other neighboring ring nodes. Otherwise, if the neighboring ring node does not receive any configuration BPDU messages with a better BPDU, it will keep sending configuration BPDU messages assuming itself or the currently best BPDU to be the root bridge.

According to an embodiment of the invention, the adjacent G.8032 capable ring nodes C 53 and E 54 may therefore be arranged to react on these configuration messages such that the ring node D believes it to be the root bridge an Ethernet ring implementing the STP protocol. As indicated in FIG. 9, this may be performed by the adjacent G.8032 capable ring nodes C 53 and E 54 by simply stopping or discarding the received STP configuration BDU messages from the ring node. D. The stopping or discarding of the received STP configuration BDU messages from the ring node D may be performed by existing message filters in the adjacent G.8032 capable ring nodes C. 53 and E 54, e.g. using ACLs (Access Control Lists), or by a modification of the software present in the adjacent G.8032 capable ring nodes C 53 and E 54. Thus, this embodiment describes enhanced behaviour in the adjacent G.8032 capable ring nodes C 53 and E 54 to interwork with a non-G.8032 capable node D 32 running STP during initial setup.

Furthermore, to interwork with a non-G.8032 capable node D 32 running RSTP, the adjacent G.8032 capable ring nodes C 53 and E 54 additionally needs to react to RSTP BPDU Proposal messages during the root bridge selection phase in the initial setup of RSTP. However, since all ring nodes running RSTP are backward compatible with ring nodes running STP, when implemented according to the IEEE 802.1D MAC Bridges standard document, and the adjacent G.8032 capable ring nodes C 53 and E 54 easily may be modified to respond in accordance with specific implementations, the interworking with RSTP is not described in any further detail herein.

Figure 10:
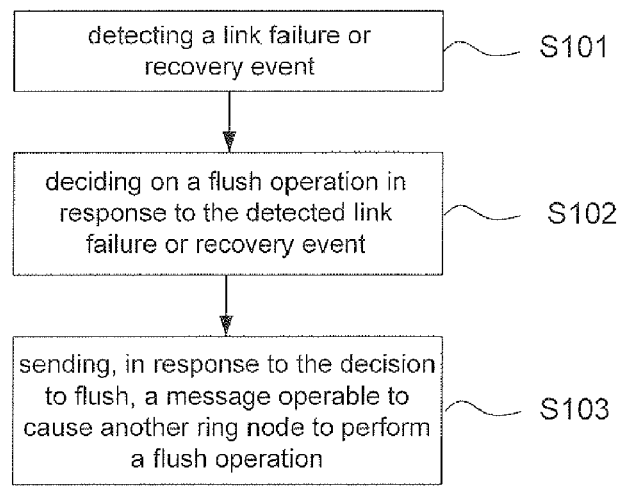
FIG. 10 shows a flowchart of a method according to a further embodiment of the invention.

FIG. 10 shows a flowchart of a method for handling link failure or recovery events in the adjacent G.8032 capable ring nodes C 53 and E 54 according to a further embodiment of the invention.

In step S101, the adjacent G.8032 capable ring nodes C 53 and E 54 may be configured to detect a link failure or recovery event. In step S102, the adjacent G.8032 capable ring nodes C 53 and E 54 may decide to perform a flush operation of its FDB in response to the link failure or recovery event detected in step S91. In step S103, the adjacent G.8032 capable ring nodes C 53 and E 54 may be configured to send a message, in response to the decision to perform the flush operation of its FDB, which is operable to cause another network node, e.g. the non-G.8032 capable ring node D 32 or the non-G.8032 capable ring nodes D1 and D2 32, to perform a flush operation of its FDB.

Although the invention is mainly described above in relation to specific Ethernet ring protection protocol standards, such as, the Ethernet ring protection protocol standards G.8032, STP and RTSP, it should be noted that this is made for illustrative purposes and that other combinations of existing or developing Ethernet ring protection protocol standards may also benefit from the advantages of the invention in a similar manner.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A first ring node arranged to protect against loops in an Ethernet ring by performing Ethernet Ring Protection (ERP) according to an Ethernet Ring Protection (ERP) protocol standard, the first ring node being located directly adjacent to at least one second ring node in the Ethernet ring which is not configured to perform ERP according to the same ERP protocol standard, wherein the first ring node comprising:
- at least one receiving ring port; and
- at least one transmitting ring port,
- wherein the first ring node is configured to, upon detection of a link failure or recovery event in the Ethernet ring resulting in a flush operation of a filtering database (FDB) in the first ring node in accordance with the ERP protocol standard, send a message on the at least one transmitting ring port to the at least one second ring node which is operable to cause said at least one second ring node to perform a flush operation of its filtering database (FDB) wherein the first ring node is configured to be communicatively connected with a third ring node in the Ethernet ring by tunneling a VLAN used by the ERP protocol standard through the at least one second ring node, wherein said third ring node in the Ethernet ring is configured to perform ERP according to the same ERP protocol standard as the first ring node, wherein the ERP protocol standard for the first ring node is the ITU-T G.8032 ERP switching protocol, and another ERP protocol standard for the at least one second ring node is the Spanning Tree Protocol (STP) or the Rapid Spanning Tree Protocol (RSTP), wherein the message comprises a Spanning Tree Protocol Topology Change Notification (STP TCN) or a Rapid Spanning Tree Protocol Topology Change Notification (RSTP TCN), and is sent by the first ring node to the at least one second ring node using the Internal Network-Network-Interface (I-NNI).

2. The first ring node according to claim 1, wherein the at least one second ring node in the Ethernet ring is configured to perform ERP according to another ERP protocol standard.

3. The first ring node according to claim 2, wherein the first ring node is further configured to react to configuration messages received by the at least one receiving ring port and sent by the at least one second ring node in the Ethernet ring according to the another ERP protocol standard such that the standard operations of the ERP according to another ERP protocol standard in the at least one second ring node is not disrupted.

4. The first ring node according to claim 1, wherein, in case the another ERP protocol standard is the Rapid Spanning Tree Protocol (RSTP), the first ring node is further configured to respond to the configuration messages sent by the at least one second ring node in the Ethernet ring during the initial setup of the Rapid Spanning Tree Protocol (RSTP).

5. The first ring node according to claim 1, wherein link failure or recovery events occurring between the first ring node and the at least one second ring node in the Ethernet ring are additionally supervised by Ethernet Continuity Check Messages (CCM) in accordance with the IEEE 802.1ag Connectivity Fault Management standard protocol.

6. A method for use in a first ring node to protect against loops in an Ethernet ring by performing ERP according to an ERP protocol standard, the first ring node being located directly adjacent to at least one second ring node in the Ethernet ring which is not configured to perform ERP according to the same ERP protocol standard, comprising the steps of:
- detecting a link failure or recovery event in the Ethernet ring according to the ERP protocol standard;
- deciding to perform a flush operation of the filtering database (FDB) in the first ring node in response to the detected link failure or recovery event, said method further comprising the step of:
- in response to the decision to perform the flush operation, sending a message to the at least one second ring node which is operable to cause said at least one second ring node to perform a flush operation of its filtering database (FDB), wherein the first ring node is configured to be communicatively connected with a third ring node in the Ethernet ring by tunneling a VLAN used by the ERP protocol standard through the at least one second ring node, wherein said third ring node in the Ethernet ring is configured to perform ERP according to the same ERP protocol standard as the first ring node, wherein the ERP protocol standard for the first ring node is the ITU-T G.8032 ERP switching protocol, and another ERP protocol standard for the at least one second ring node is the Spanning Tree Protocol (STP) or the Rapid Spanning Tree Protocol (RSTP), wherein the message comprises a Spanning Tree Protocol Topology Change Notification (STP TCN) or a Rapid Spanning Tree Protocol Topology Change Notification (RSTP TCN), and is sent by the first ring node to the at least one second ring node using the Internal Network-Network-Interface (I-NNI).

7. The method according to claim 6, comprising:
reacting, where the at least one second ring node in the Ethernet ring is configured to perform ERP according to the another ERP protocol standard, to configuration messages sent by the at least one second ring node in the Ethernet ring such that the standard operations of the ERP according to the another ERP protocol standard in the at least one second ring node is not disrupted.

8. The method according to claim 7, further comprising the step of:
responding, in case the another ERP protocol standard is the Rapid Spanning Tree Protocol (RSTP), to the configuration messages sent by the at least one second ring node in the Ethernet ring during the initial setup of the Rapid Spanning Tree Protocol (RSTP).

9. An Ethernet ring comprising a first ring node and at least a second ring node arranged to protect against loops in an Ethernet ring by performing ERP according to an ERP protocol standard, said Ethernet ring further comprising at least a third ring node which is not configured to perform ERP according to the same ERP protocol standard, characterized in that
each of the first and at least second ring node that is located directly adjacent to the at least one third ring node in the Ethernet ring is configured to, upon detection of a link failure or recovery event in the Ethernet ring resulting in a flush operation of filtering databases (FDB) in the first and at least second ring node in accordance with the ERP protocol standard, send a message to said at least one third ring node operable to cause said at least one third ring node to perform a flush operation of its filtering database (FDB), wherein the ERP protocol standard for the first ring node is the ITU-T G.8032 ERP switching protocol, and another ERP protocol standard for the at least one second ring node is the Spanning Tree Protocol (STP) or the Rapid Spanning Tree Protocol (RSTP), wherein the message comprises a Spanning Tree Protocol Topology Change Notification (STP TCN) or a Rapid Spanning Tree Protocol Topology Change Notification (RSTP TCN), and is sent by the first ring node to the at least one second ring node using the Internal Network-Network-Interface (I-NNI).

10. The Ethernet ring according to claim 9, wherein, in case of the at least one third ring node being configured to perform ERP according to the another ERP protocol standard and comprising more than one ring node, resilience measures for the connectivity between the more than one ring nodes is provided.

11. A broadband communications network comprising a ring node according to claim 1.

12. A method for use in an Ethernet ring comprising a first ring node and at least a second ring node arranged to protect against loops in an Ethernet ring by performing ERP according to an ERP protocol standard, said Ethernet ring further comprising at least one third ring node which is not configured to perform ERP according to the same ERP protocol standard, comprising the steps of:

detecting a link failure or recovery event in the Ethernet ring according to the Ethernet ring protection protocol standard;

deciding to perform a flush operation of a filtering database (FDB) in each of the first and at least second ring node in response to the detected link failure or recovery event; and in response to the decision to perform the flush operation, sending a message from each of the first and at least second ring node that are located directly adjacent to the at least one third ring node in the Ethernet ring to the at least one third ring node which is operable to cause said at least one third ring node to perform a flush operation of its filtering database (FDB), wherein the ERP protocol standard for the first ring node is the ITU-T G.8032 ERP switching protocol, and another ERP protocol standard for the at least one second ring node is the Spanning Tree Protocol (STP) or the Rapid Spanning Tree Protocol (RSTP), wherein the message comprises a Spanning Tree Protocol Topology Change Notification (STP TCN) or a Rapid Spanning Tree Protocol Topology Change Notification (RSTP TCN), and is sent by the first ring node to the at least one second ring node using the Internal Network-Network-Interface (I-NNI).

* * * * *